United States Patent
Simon et al.

(10) Patent No.: US 7,292,654 B2
(45) Date of Patent: Nov. 6, 2007

(54) REDUCED COMPLEXITY CODING SYSTEM USING ITERATIVE DECODING

(75) Inventors: Marvin K. Simon, La Cañada, CA (US); Dariush Divsalar, Pacific Palisades, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 11/513,927

(22) Filed: Aug. 31, 2006

(65) Prior Publication Data

US 2007/0127594 A1   Jun. 7, 2007

Related U.S. Application Data

(62) Division of application No. 10/131,611, filed on Apr. 23, 2002.

(60) Provisional application No. 60/285,903, filed on Apr. 23, 2001.

(51) Int. Cl.
*H03D 3/22* (2006.01)
*H03D 3/00* (2006.01)

(52) U.S. Cl. .......... 375/329; 375/340; 375/341
(58) Field of Classification Search ........ 375/340–341, 375/130, 261–262, 264–265, 316, 295; 370/342, 370/494, 463, 467, 496; 371/37.4, 37.6, 371/37.06, 43, 43.6; 714/755, 794, 795
See application file for complete search history.

(56) References Cited

U.S. PATENT DOCUMENTS 6,298,461 B1 *   10/2001   Tong et al. ............... 714/755
2002/0110206 A1 *   8/2002   Becker et al. ............ 375/346

OTHER PUBLICATIONS

Mehdi et. al., "FQPSK, Power and Spectral Efficient Family of Modulation for Wireless Communicatin Systems", IEEE 1994.*
Li et. al., "Bit-Interleaved coded modulation with iterative decoding using soft feedback", Eletronic Letters 1998.*

* cited by examiner

*Primary Examiner*—Mohammed Ghayour
*Assistant Examiner*—Sophia Vlahos

(57) ABSTRACT

A concatenated coding scheme, using an outer coder, interleaver, and the inner coder inherent in an FQPSK signal to form a coded FQPSK signal. The inner coder is modified to enable interative decoding of the outer code.

22 Claims, 13 Drawing Sheets

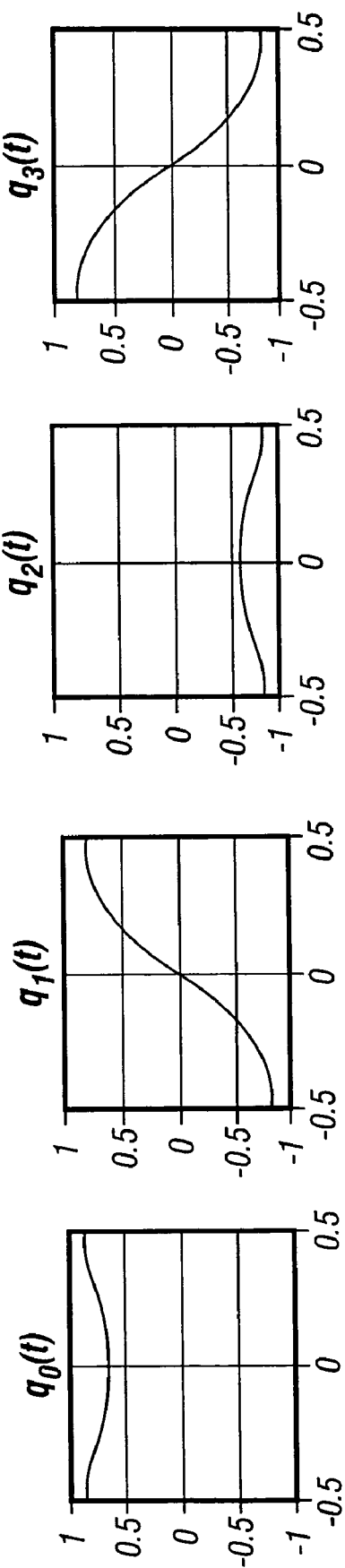
FIG. 6A  FIG. 6B  FIG. 6C  FIG. 6D
FIG. 6
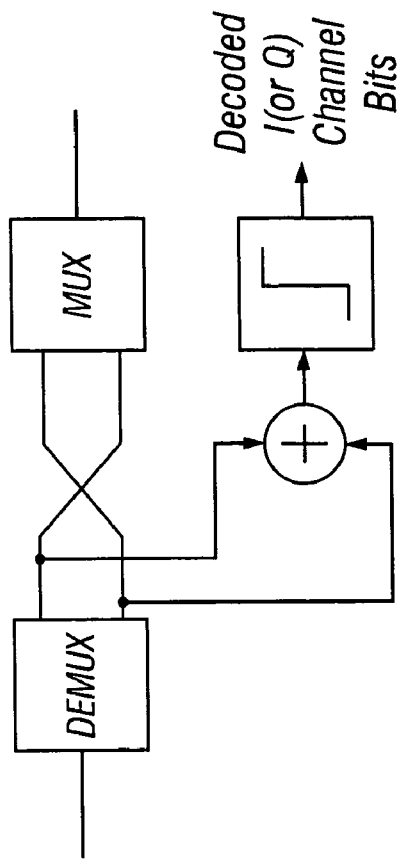
FIG. 14
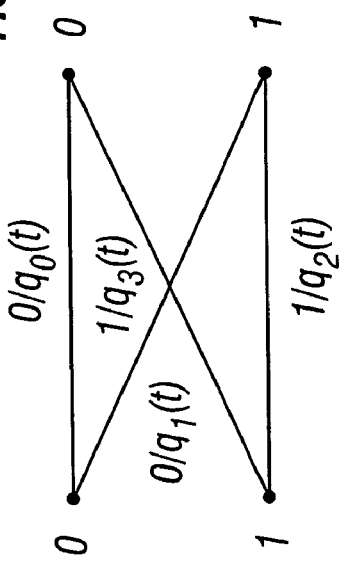
FIG. 7

US 7,292,654 B2

REDUCED COMPLEXITY CODING SYSTEM USING ITERATIVE DECODING

CROSS-REFERENCE TO RELATED APPLICATIONS

This application is a divisional of U.S. patent application Ser. No. 10/131,611, entitled "REDUCED COMPLEXITY CODING SYSTEM USING ITERATIVE DECODING", filed Apr. 23, 2002, hereby incorporated by reference, which claims benefit of U.S. provisional patent application Ser. No. 60/285,903, filed Apr. 23, 2001.

STATEMENT REGARDING FEDERALLY SPONSORED RESEARCH OR DEVELOPMENT

This invention was made with Government support under grant no. NAS7-1407. The government may have certain rights in this invention.

SUMMARY

Properties of a channel affect the amount of data that can be handled by the channel. The so-called "Shannon limit" defines the theoretical limit of amount of data that a channel can carry.

Different techniques have been used to increase the data rate that can be handled by a channel. "Near Shannon Limit Error-Correcting Coding and Decoding: Turbo Codes," by Berrou et al. ICC, pp 1064-1070, (1993), described a new "turbo code" technique that has revolutionized the field of error correcting codes.

Turbo codes have sufficient randomness to allow reliable communication over the channel at a high data rate near capacity. However, they still retain sufficient structure to allow practical encoding and decoding algorithms.

Feher's patented QPSK, or FQPSK, as described in detail in U.S. Pat. Nos. 4,567,602; 4,339,724; 4,644,565; 5,784,402; and 5,491,457 is a coded modulation scheme. The generic form of FQPSK is based on crosscorrelated phase-shift-keying. FQPSK maintains a nearly constant envelope, that is the maximum fluctuation in the envelope is around 0.18 dB. This is done by manipulating the pulse shapes of the in-phase "I" and quadrature "Q" signals using crosscorrelation mapping.

Many different variants of FQPSK are known, including FQPSK-B, which is a bandwidth limited form of FQPSK.

The price of this spectral efficiency of these coded modulation schemes may be a degradation in the bit error rate performance.

SUMMARY OF THE INVENTION

The present application teaches a new technique which allows additional power efficiency and bandwidth efficiency with a simple receiver architecture. This technique may use turbo coding techniques, along with a specially configured FQPSK encoder and/or decoder, to form a concatenated coded modulation scheme.

BRIEF DESCRIPTION OF THE DRAWINGS

These and other aspects will now be described in detail with reference to the accompanying drawings, wherein:

FIG. 6 shows averaged waveforms for the simplified receiver;

FIG. 7 shows at trellis diagram for the simplified receiver;

FIG. 14 shows a soft input soft output outer decoder for a rate ½ repetition outer code.

DETAILED DESCRIPTION

Figure 1:
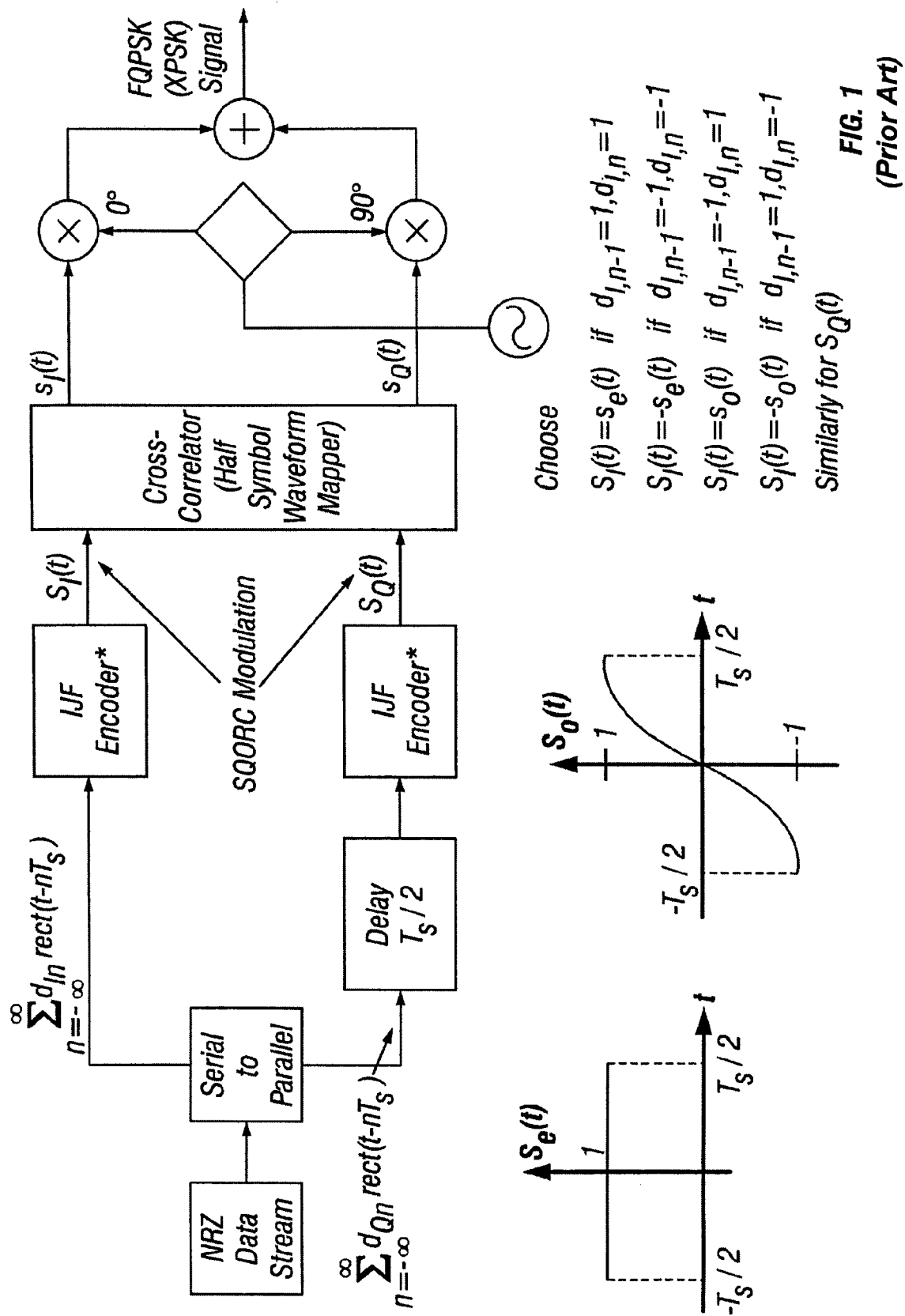
FIG. 1 shows a conceptual diagram of FQPSK.

FQPSK in its standard form is similar to many phase-shift-keying techniques which had been previously used. A conceptual diagram of FQPSK is shown in FIG. 1. One advantage of the specific FQPSK system is a 3 db envelope reduction based on intentional but controlled crosscorrelation between the I and Q channels. This was described by half symbol mappings of the 16 possible combinations of I and Q channel waveforms that were present in the signal, into a specified set of 16 waveform combinations. These 16 waveform combinations were selected in a way that rendered the crosscorrelated output time continuous. The waveform combinations also had unit, normalized, envelopes at each of the I and Q uniform sampling instants.

Since the crosscorrelation mapping was based on half symbol characterization of the signal, there was no guarantee that the slope of the crosscorrelated output waveform would be continuous at the transitions between the half symbol points. In fact, a slope discontinuity may occur statistically one-quarter of the time.

In a copending patent application, it is suggested to structure the crosscorrelation mapping into a full symbol by symbol mapping, rather than a half symbol by half symbol representation. In fact, this technique also has the advantage of enabling data transitions on the I and Q channels to be described directly. Moreover, this enables a receiver for FQPSK which exploits the specific correlation (memory) that is introduced into the modulation scheme.

Figure 2:
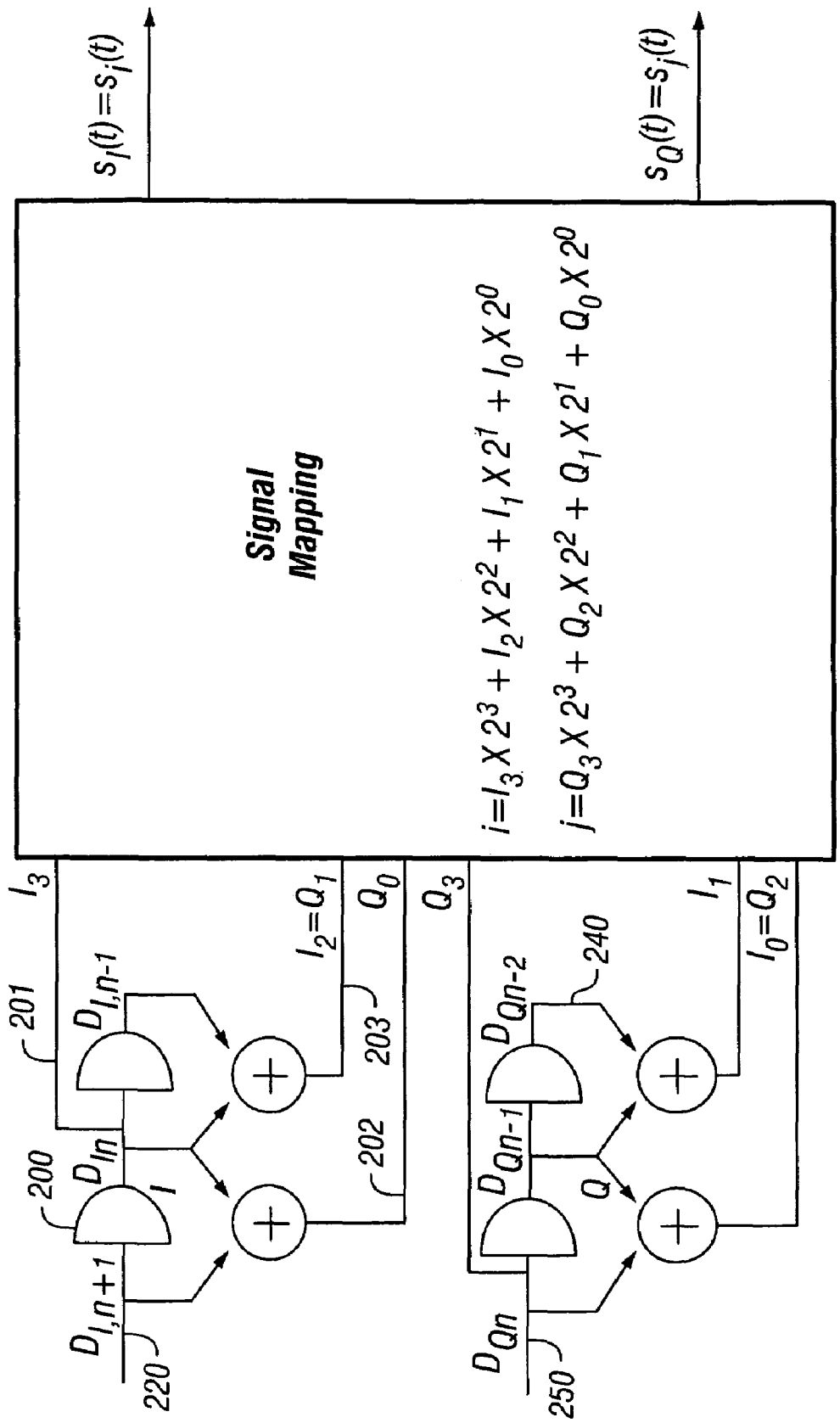
FIG. 2 shows an alternative implementation of the baseband signals using mapping.

FIG. 2 illustrates the interpretation of FQPSK as a trellis-coded modulation. The input streams of data bits are split into time-aligned I and Q symbol streams at half the usual bit rate, so $1/T_s = \frac{1}{2}T_b$. Each of these symbol streams is passed through specific rate ⅓ encoders. The rate ⅓ encoder 200 for the I stream 200 is different than the rate ⅓ encoder 240 for the Q stream 250. The output bits of these encoders are then considered to be grouped into one of three different categories.

The three categories include a first category of bits that only influence the choice of the signal in the same channel. A second category of bits only influence the choice of the signal in the other channel. A third category of bits influence choices of signals in both channels, that is represent crosscorrelation mapping.

Out of the bit sequences from the I encoder 200, the value I3 signal 201 is used to determine the signal that is transmitted on the I channel. The value Q0 signal 202, is used to determine the signal transmitted on the Q channel. The value I2, which is the same as Q1, signal 203, is used to determine both the signals transmitted on I and Q channels.

If $d_{In}$ and $d_{Qn}$ respectively denote the +1 and −1 I and Q data symbols in the nth transmission interval and $D_{In} \triangleq (1-d_{In})/2$ and $D_{Qn} \triangleq (1-d_{Qn})/2$ their (0,1) equivalents, then the mappings appropriate to the I and Q encoders of FIG. 2 are $I_0 = D_{Qn} \oplus D_{Q,n-1}$, $Q_0 = D_{I,n+1} \oplus D_{In}$ $I_1 = D_{Q,n-1} \oplus D_{Q,n-}$, $Q_1 = D_{In} \oplus D_{I,n-1} = I_2$ $I_2 = D_{In} \oplus D_{I,n-1}$, $Q_2 = D_{Qn} \oplus D_{Q,n-1} = I_0$ $I_3 = D_{In}$, $Q_3 = D_{Qn}$ \hfill (1)

These values correspond to the four, I channel coded bits which include two from the I encoder output and two from the Q encoder output. Analogously, it includes four, Q channel encoded bits.

The values i,j are used as binary coded decimal indices defined as follows:

$i = I_3 \times 2^3 + I_2 \times 2^2 + I_1 \times 2^1 + I_0 \times 2^0$ $j = Q_3 \times 2^3 + Q_2 \times 2^2 + Q_1 \times 2^1 + Q_0 \times 2^0$ \hfill (2)

Figure 3:
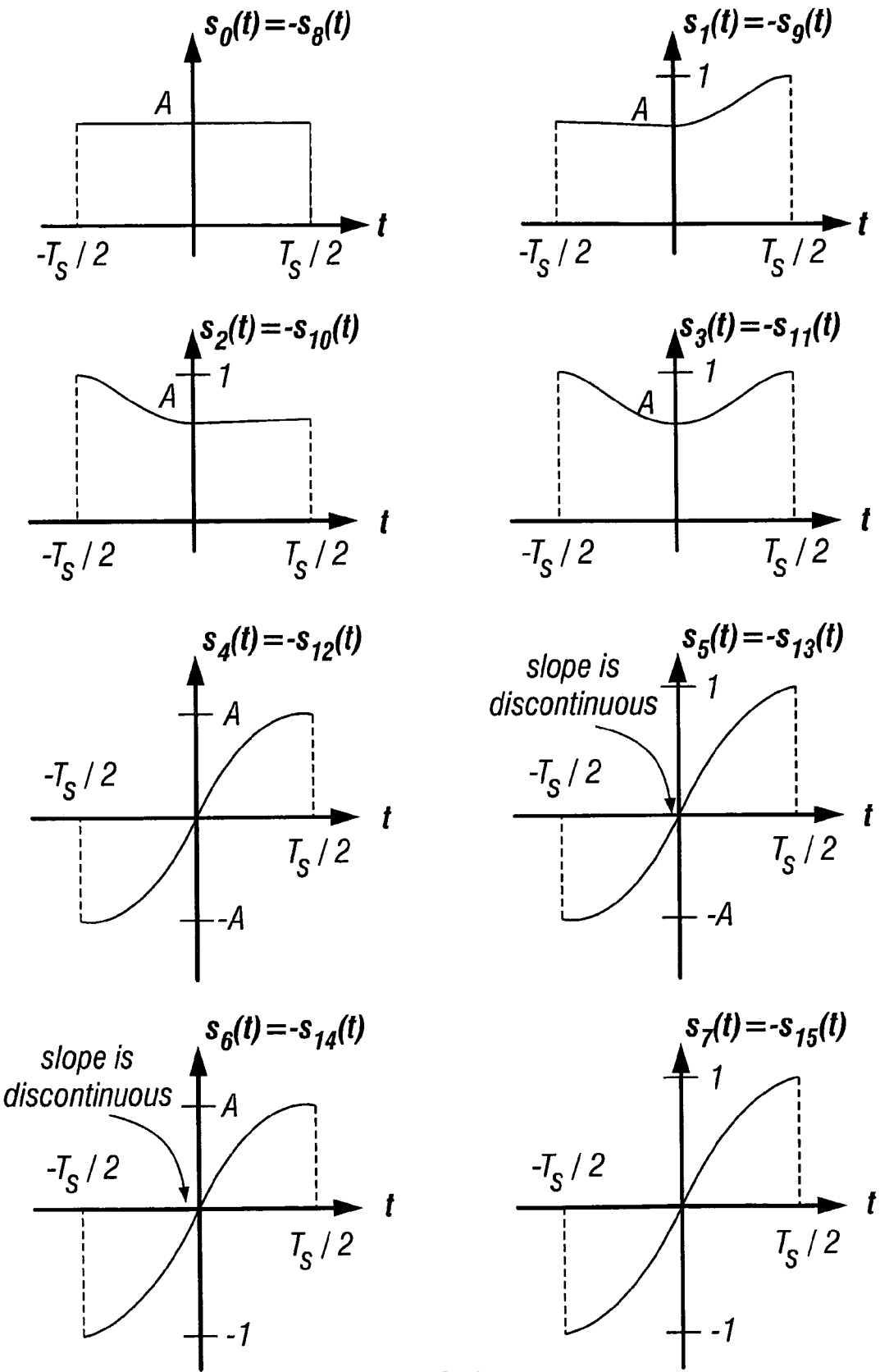
FIG. 3 shows full symbol waveforms of FQPSK.

The indices i and j may range between zero and 15. A set of baseband signals are shown in FIG. 3. These symbols may be defined as $$s_1(t) = \begin{cases} A, & -T_s/2 \leq t \leq 0 \\ 1 - (1-A)\cos^2 \frac{\pi t}{T_s}, & 0 \leq t \leq T_s/2, \end{cases} \quad s_9(t) = -s_1(t) \quad (3)$$

$$s_2(t) = \begin{cases} 1 - (1-A)\cos^2 \frac{\pi t}{T_s}, & -T_s/2 \leq t \leq 0 \\ A, & 0 \leq t \leq T_s/2, \end{cases} \quad s_{10}(t) = -s_2(t)$$

$$s_3(t) = 1 - (1-A)\cos^2 \frac{\pi t}{T_s}, -T_s/2 \leq t \leq T_s/2, \quad s_{11}(t) = -s_3(t)$$

$$s_4(t) = A\sin\frac{\pi t}{T_s}, -T_s/2 \leq t \leq T_s/2, \quad s_{12}(t) = -s_4(t)$$

$$s_5(t) = \begin{cases} A\sin\frac{\pi t}{T_s}, & -T_s/2 \leq t \leq 0 \\ \sin\frac{\pi t}{T_s}, & 0 \leq t \leq T_s/2, \end{cases} \quad s_{13}(t) = -s_5(t)$$

$$s_6(t) = \begin{cases} \sin\frac{\pi t}{T_s}, & -T_s/2 \leq t \leq 0 \\ A\sin\frac{\pi t}{T_s}, & 0 \leq t \leq T_s/2, \end{cases} \quad s_{14}(t) = -s_6(t)$$

$$s_7(t) = \sin\frac{\pi t}{T_s}, -T_s/2 \leq t \leq T_s/2, \quad s_{15}(t) = -s_7(t)$$

The pair of indices are used to select which of these baseband signals $s_i(t)$, $s_j(t)$ will be transmitted respectively over the I and Q channels in any symbol interval.

For any value of A other than unity, certain waveforms will have a discontinuous slope at their midpoints (T=0). For example, it has been suggested that A should equal 1/sqrt(2) to produce minimum envelope fluctuation. When that happens, the waveforms 5 and 6 as well as their negatives 13 and 14, will have a discontinuous slope at those midpoints.

Finally, the I and Q baseband signals $s_i(t)$ and $s_q(t)$ are offset by half a symbol relative to one another, and modulated onto the quadrature channels for transmission.

Figure 4:
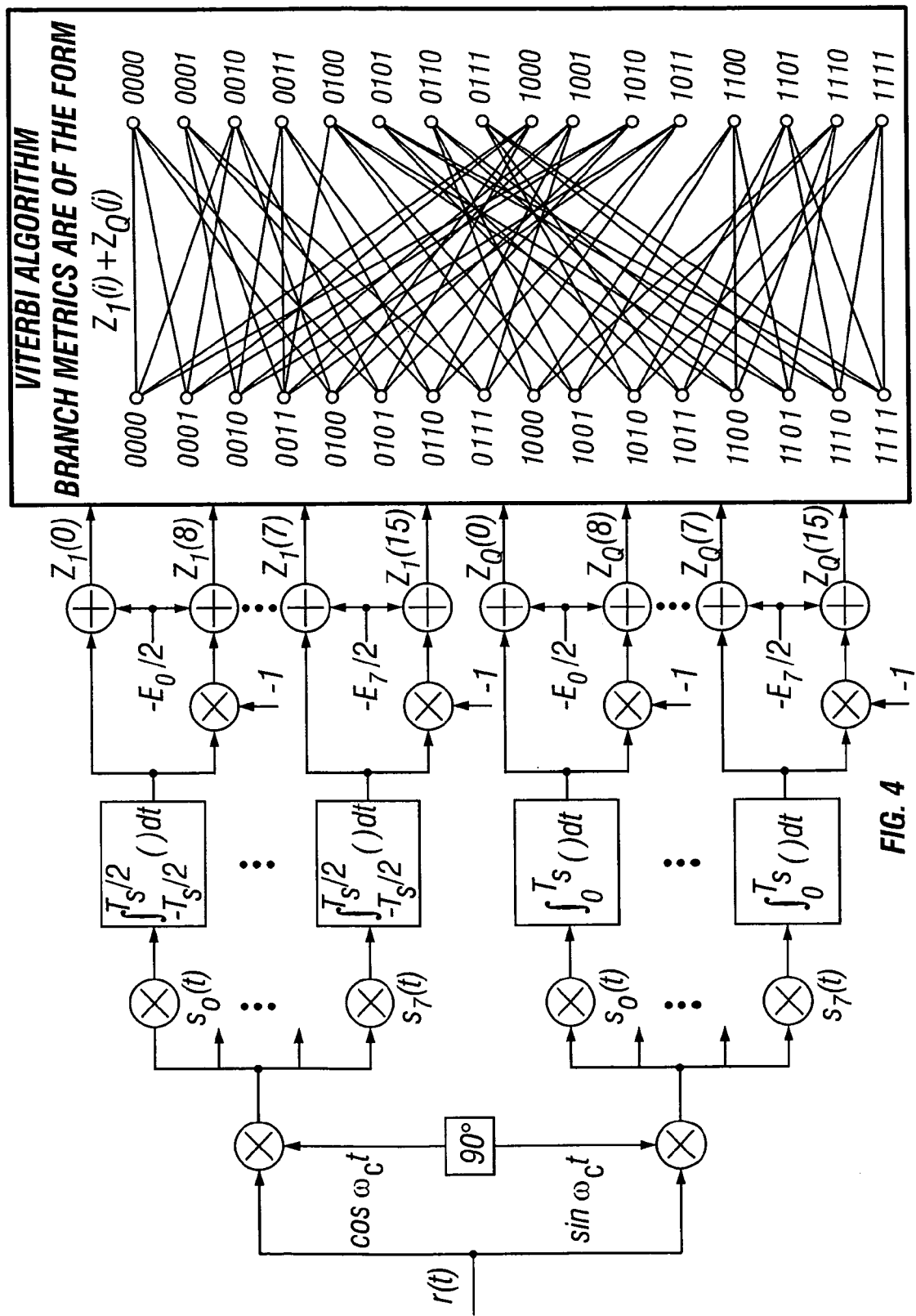
FIG. 4 shows a trellis decoding interpretation used for a receiver.
Figure 5:
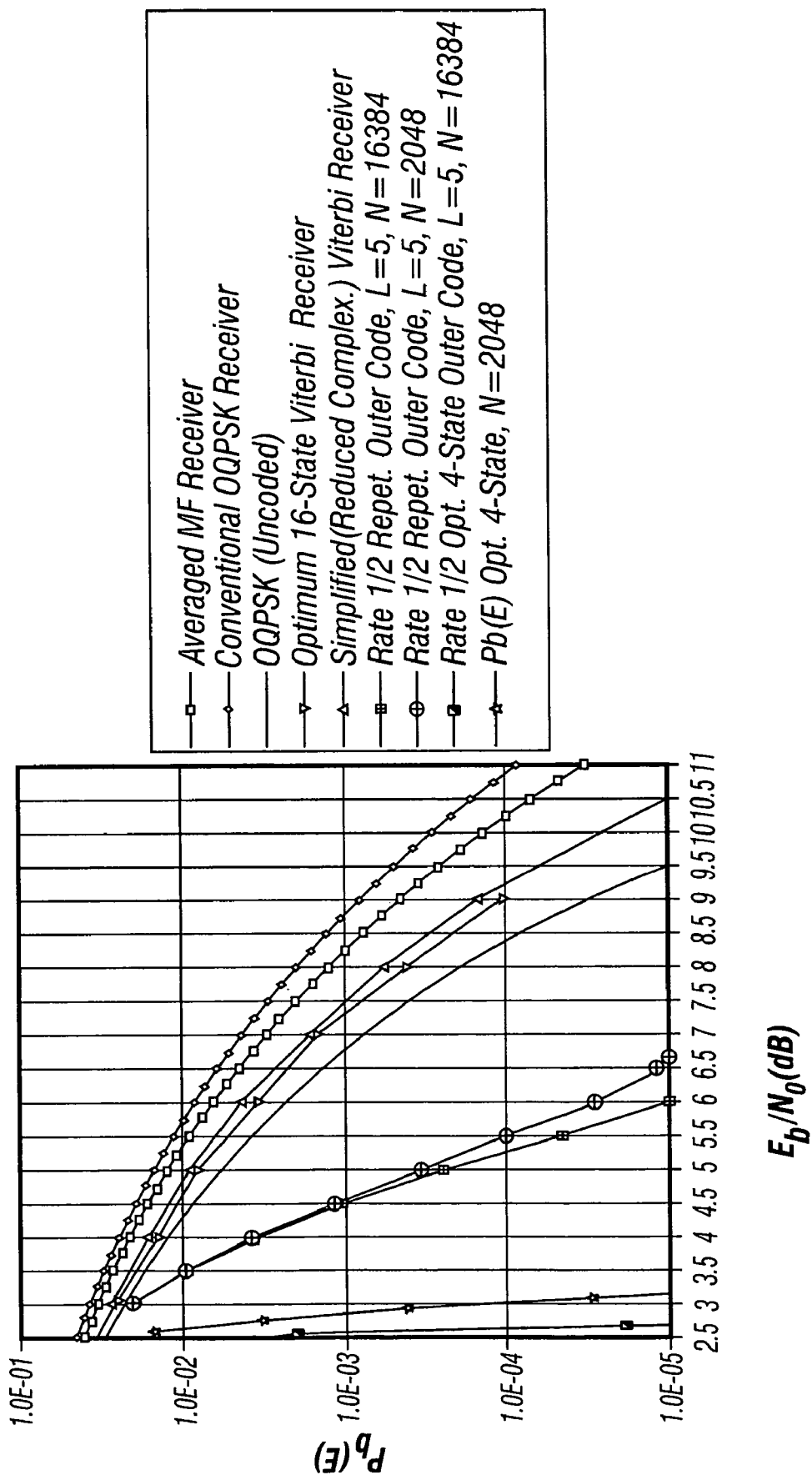
FIG. 5 shows a bit error rate comparison of the different techniques.

This trellis-coded characterization of FQPSK is, in principal, an M-ary signaling scheme. This means that a given pair of I and Q data symbols results in the transmission of a given pair of I and Q waveforms in each signaling interval. Restrictions are placed on the allowable sequences of waveforms that can be transmitted in either of these channels to produce continuous I and Q waveform sequences. The present inventors noticed that these restrictions on the transitional behavior of the transmitted signal results in the narrow spectrum characteristic of FQPSK. The inventors also noticed that the trellis coded structure of the transmitter suggests that an optimum receiver for FQPSK should be a form of trellis demodulator. It has been suggested to use of bank of 16 biased matched filters followed by a 16 state trellis demodulator. This configuration is shown in FIG. 4. The simulated bit error rate performance of this receiver is shown in FIG. 5 and compared with a conventional receiver as well as the performance of conventional uncoded QPSK.

This receiver may be relatively complex, and hence simplified configurations may be desirable. An averaged matched filter that is matched to the average of the 16 waveforms may replace the bank of 16 matched filters. A reduced complexity of the Viterbi receiver recognizes similarities in shape properties of certain members of the waveforms, and separates them into different groups. The waveforms s0-s3 are grouped as a first, composite waveform, with each four waveforms being similarly grouped as follows:

$$q_0(t) = \sum_{i=0}^{3} s_i(t), \quad q_1(t) = \sum_{i=4}^{7} s_i(t), \quad (4)$$

$$q_2(t) = \sum_{i=8}^{11} s_i(t) = -q_0(t), \quad q_3(t) = \sum_{i=12}^{15} s_i(t) = -q_1(t)$$

Figure 8:
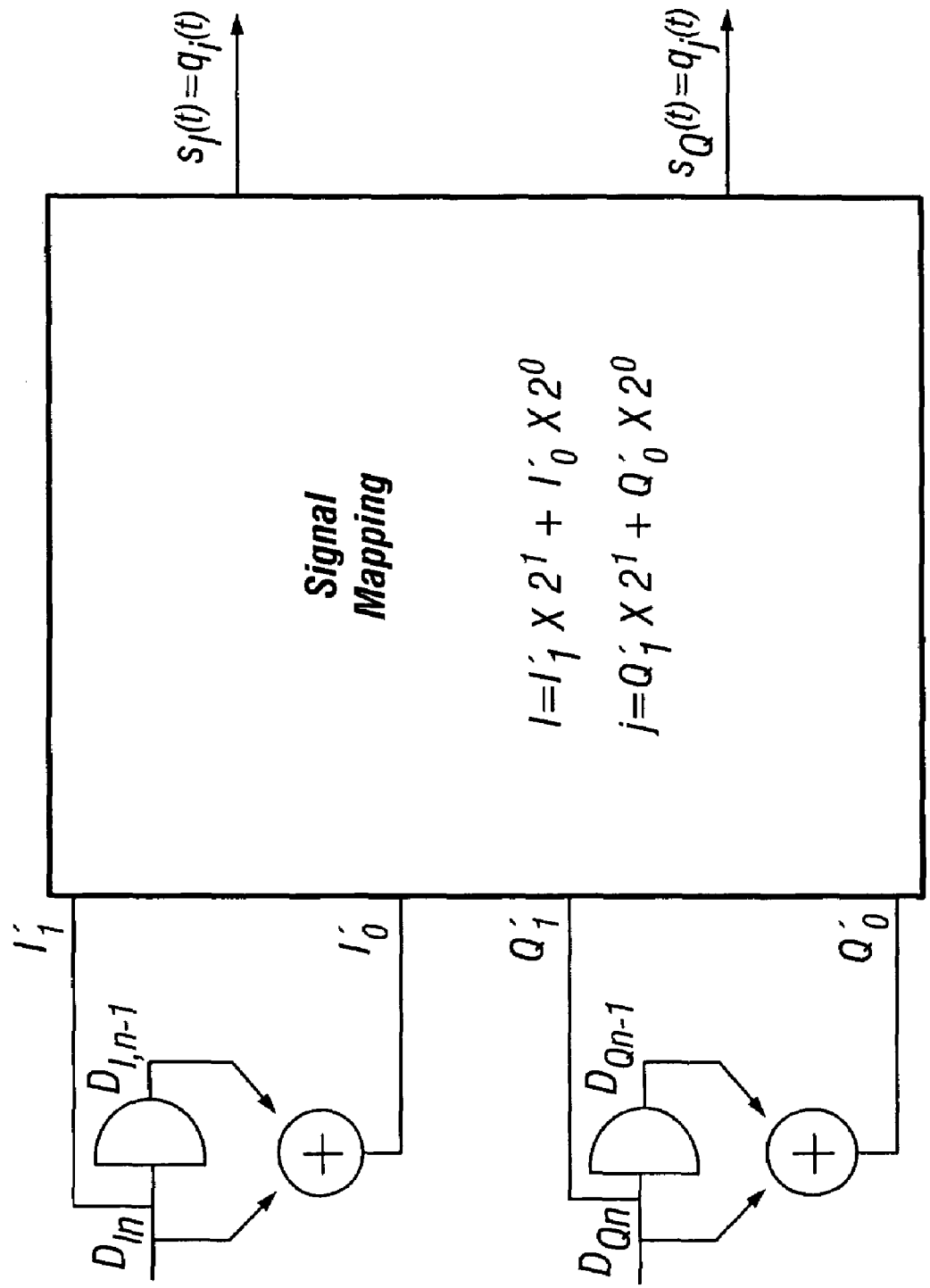
FIG. 8 shows a simplified implementation of the baseband signals.
Figure 9:
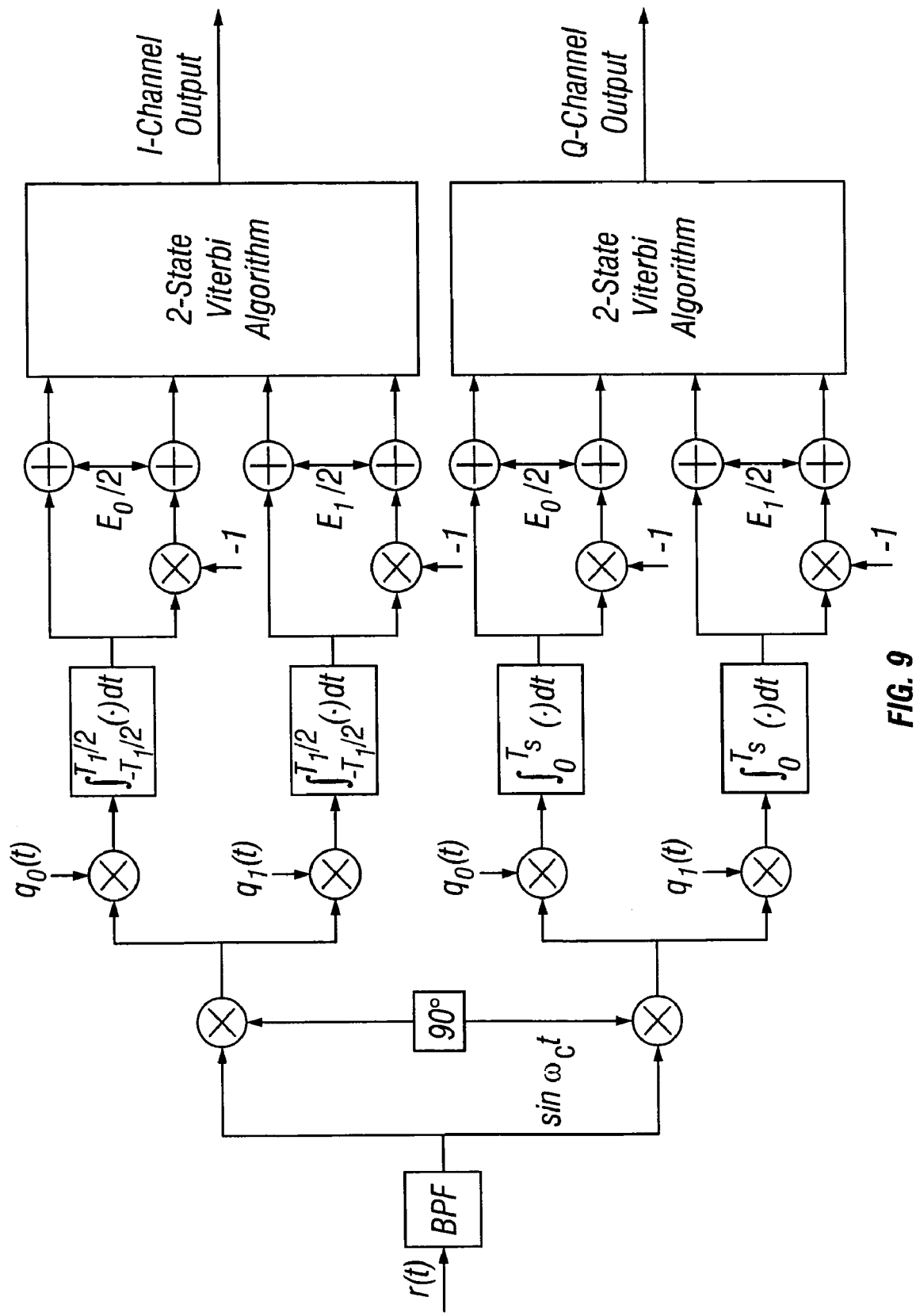
FIG. 9 shows a simplified receiver.

The waveform assignments of the group members are then replaced by their corresponding average waveform that is, any of s0 to s3 become q0 to q3. This causes the crosscorrelation between the I and Q channels to effectively disappear. Effectively, the I channel signal is selected based on only the I encoder output bits, and the Q channel signal is based on only the Q encoder output bits. When this happens, then the trellis coded structure decouples into two independent I and Q two state trellises; see FIG. 7. The transmitter simplifies into the FIG. 8 structure with a corresponding optimum receiver being shown in FIG. 9. The I and Q decisions are no longer produced jointly, but rather are produced separately by individual Viterbi techniques acting on energy based correlations from the I and Q modulated signals. The degradation in bit error rate relative to the optimum receiver may be compensated by the significant reduction in complexity of the receiver.

FQPSK, as described above is a convolutional coded modulation. It is recognized by the inventors that a potentially large coding gain may be achievable using iterative/recursive encoding and decoding of concatenated codes with a soft input soft output a posteriori probability algorithm.

The techniques of concatenated codes are well-known. In general, this system has two encoders: an outer coder and an inner coder separated by an interleaver. A serial concatenated code operates serially, while a parallel concatenated code operates in parallel. An outer encoder receives the uncoded data. The outer coder can be an (n,k) binary linear encoder where n>k. The means that the encoder 200 accepts as input a block u of k data bits. It produces an output block v of n data bits. In its simplest form, the outer coder may be a repetition coder. The outer coder codes data with a rate that is less than 1, and may be, for example, ½ or ⅓.

The interleaver 220 performs a fixed pseudo-random permutation of the block v, yielding a block w having the same length as v. The permutation can be an identity matrix, where the output becomes identically the same as the input. Alternately and more preferably, the permutation rearranges the bits in a specified way.

The inner encoder 210 is a linear rate 1 encoder.

Figure 10A:
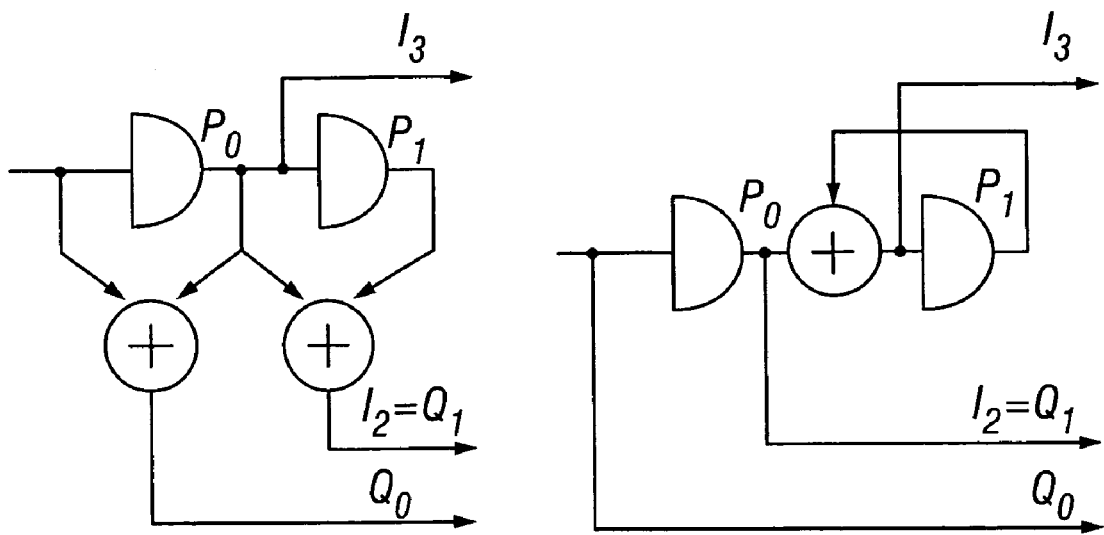
FIGS. 10 a-b show original and remapped encoders and trellises for the receiver to be used in concatenated schemes.
Figure 10A:
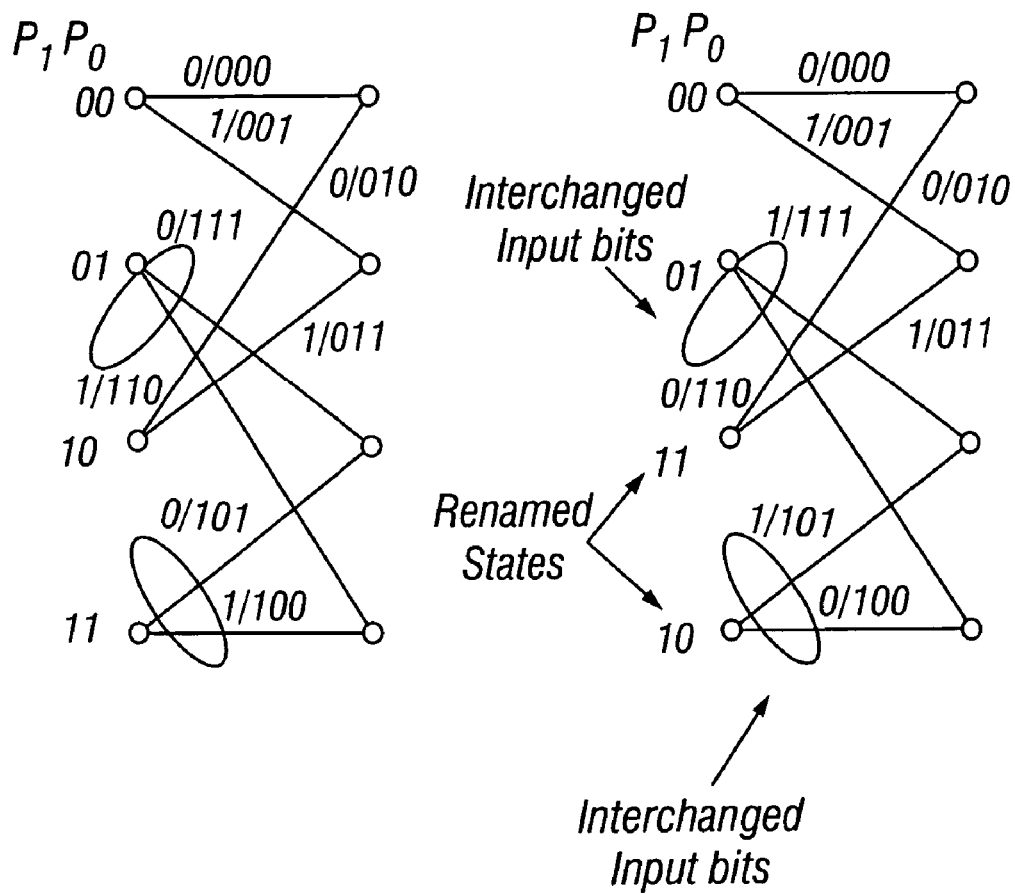
Figure 10B:
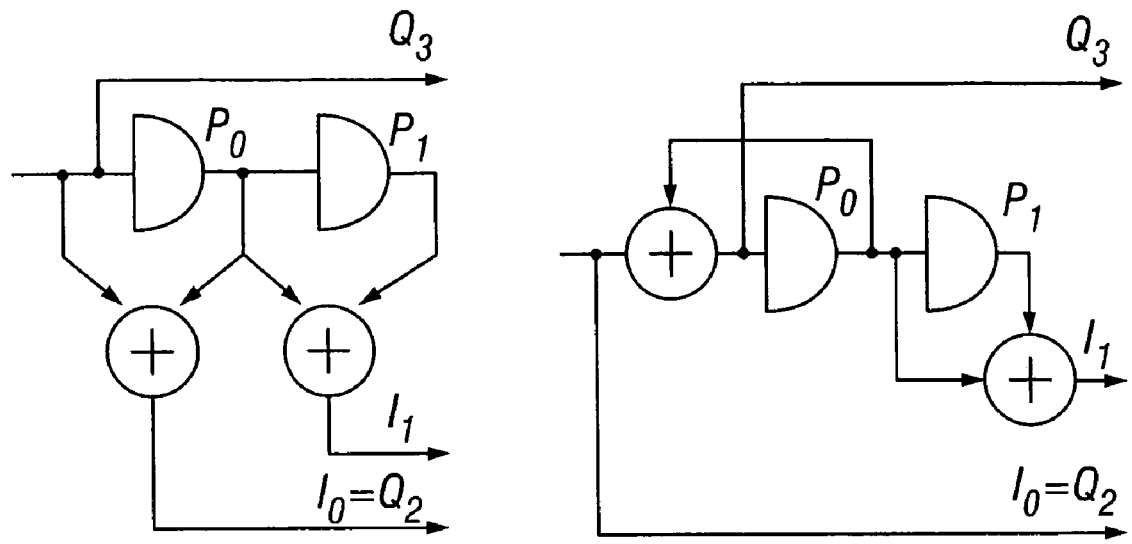
Figure 10B:
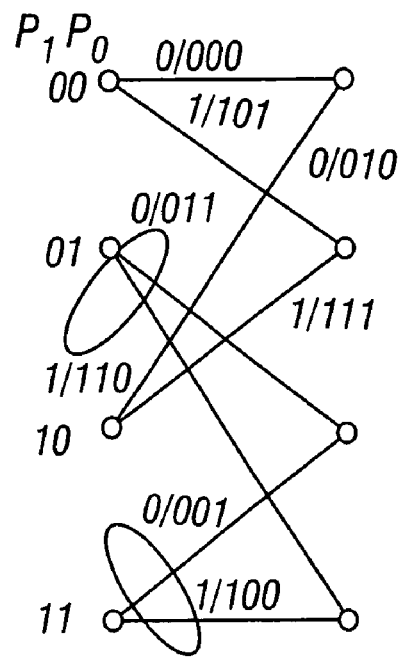
Figure 10B:
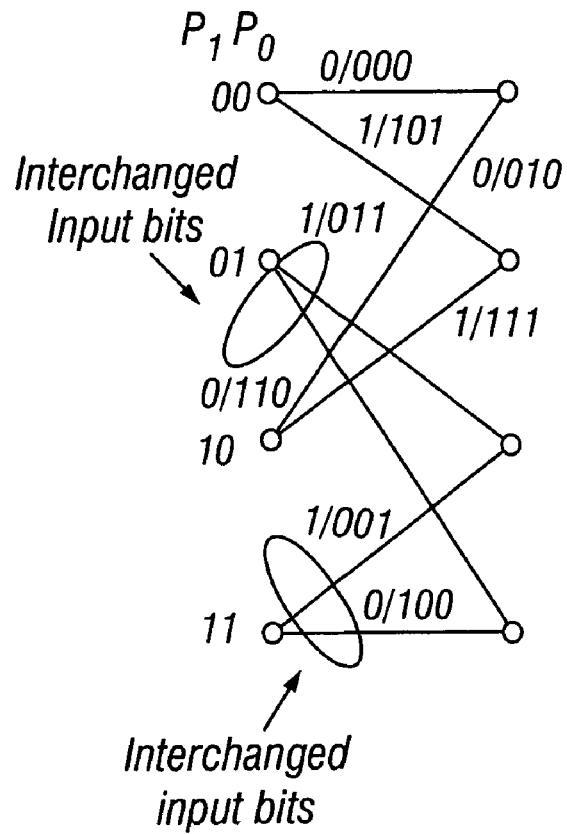

According to a present system, this technique is applied to FQPSK. It is recognized that the inherent coding that is carried out in FQPSK may supply the inner code for the iterative concatenated code. In the embodiments, the outer coded signal is applied to a FQPSK system which may use the simplified receiver of FIG. 9. The two state Viterbi algorithms are replaced with two state soft input-soft output (SISO) Max-log algorithms as described in the literature. These may be considered as modified soft output Viterbi algorithms. An interleaving/deinterleaving process is applied between the inner and outer codes. A coding gain from this interleaving process can be obtained by remapping the I and Q FQPSK inner codes from nonrecursive into-recursive type codes, using other known techniques. FIGS. 10*a*-10*b* show the original I and Q encoders and the remapped I and Q encoders for this purpose.

This remapping provides recursiveness for the parts of the FQPSK encoders that are matched to the reduced two state soft input-soft output decoder for the inner code.

The remapped encoders would produce different baseband waveforms. However, the allowable FQPSK encoder output sequences would remain the same. Therefore, both the envelope and spectral characteristics of the modulated signal would be identical to those produced by the FQPSK signal in the transmitter in FIG. 2.

When an outer code is added, an interleaver is used which has a size that is large enough to approximately output an uncorrelated sequence.

Figure 11:
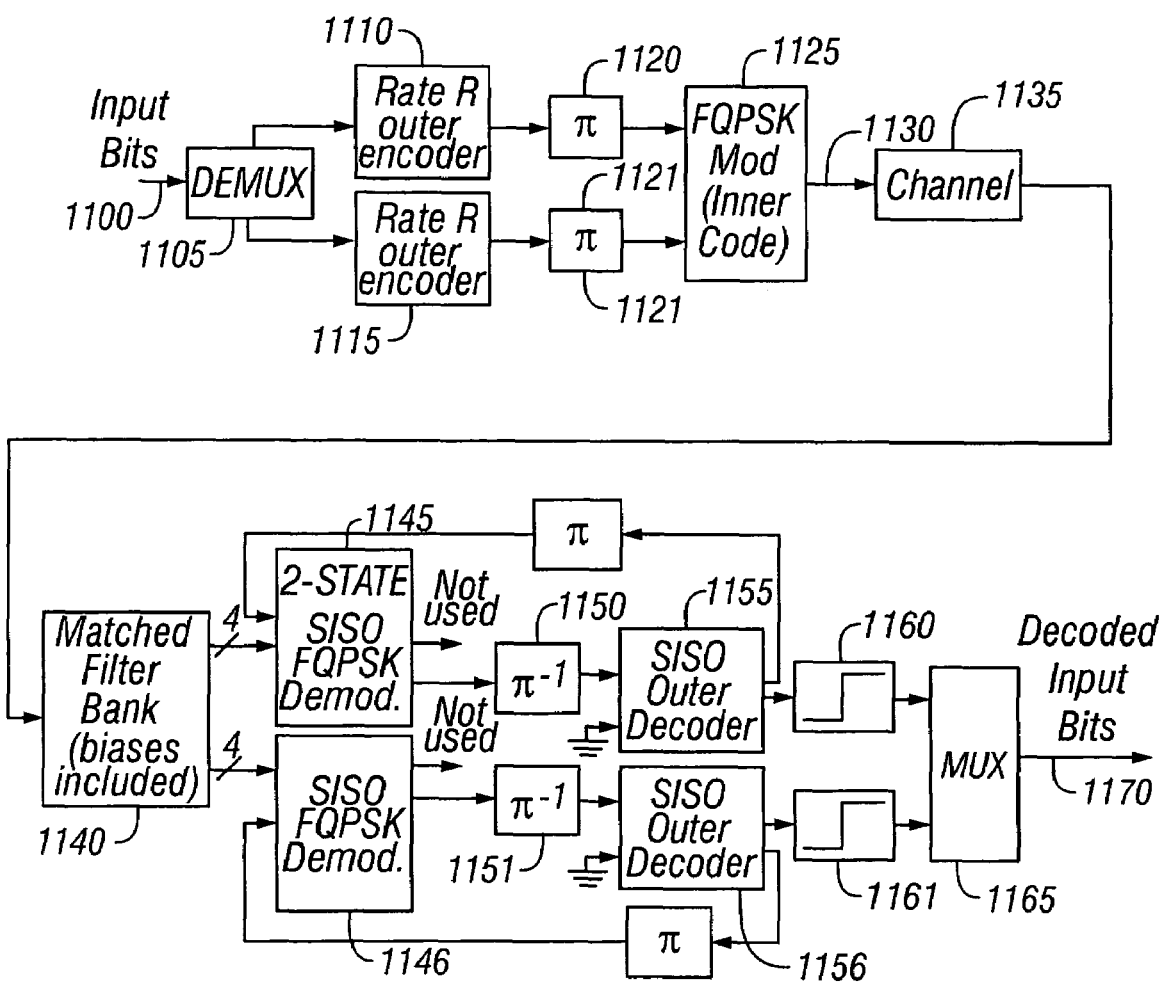
FIGS. 11-13 show embodiments of the improved transmitter and receiver.
Figure 12:
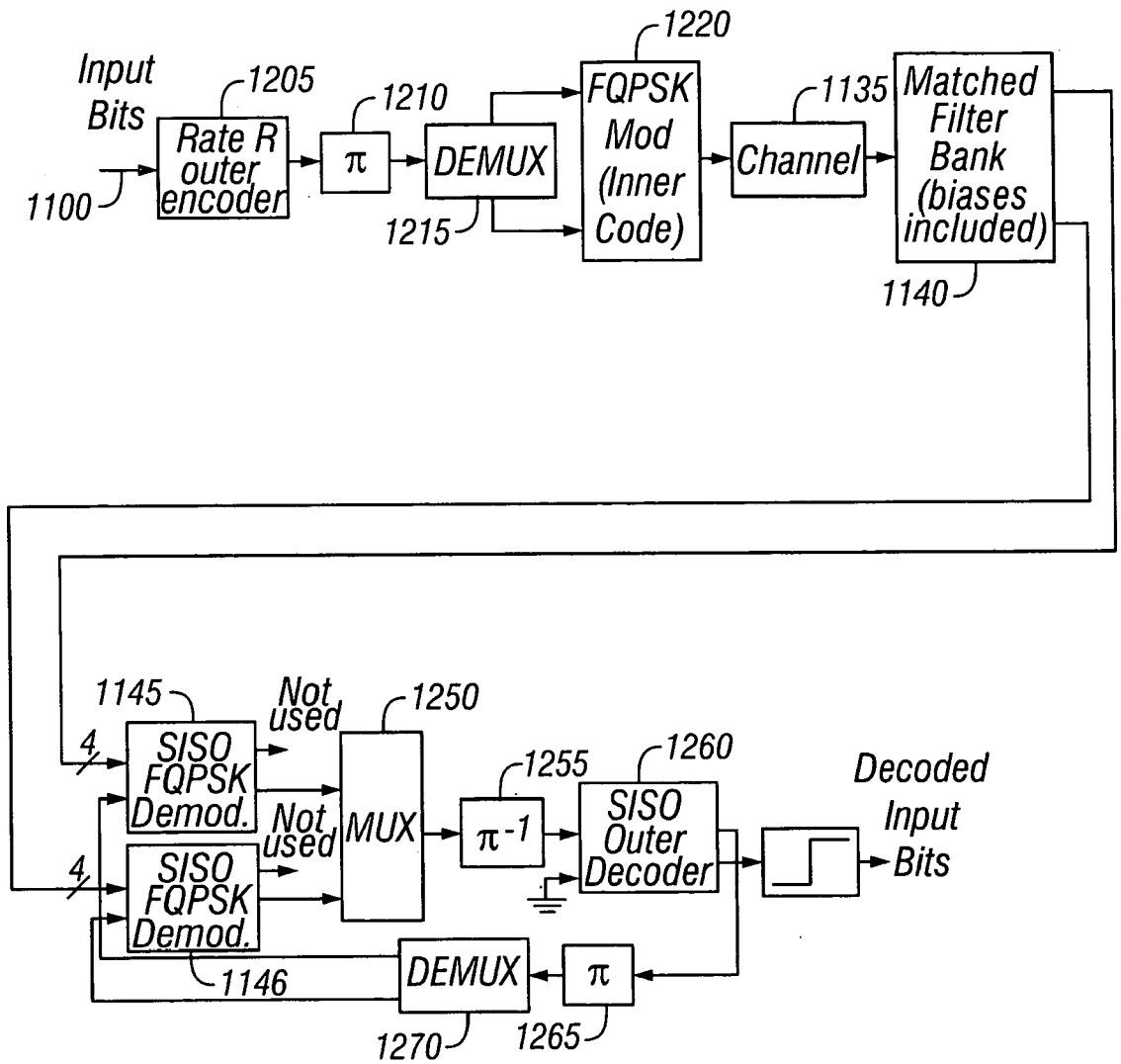
Figure 13:
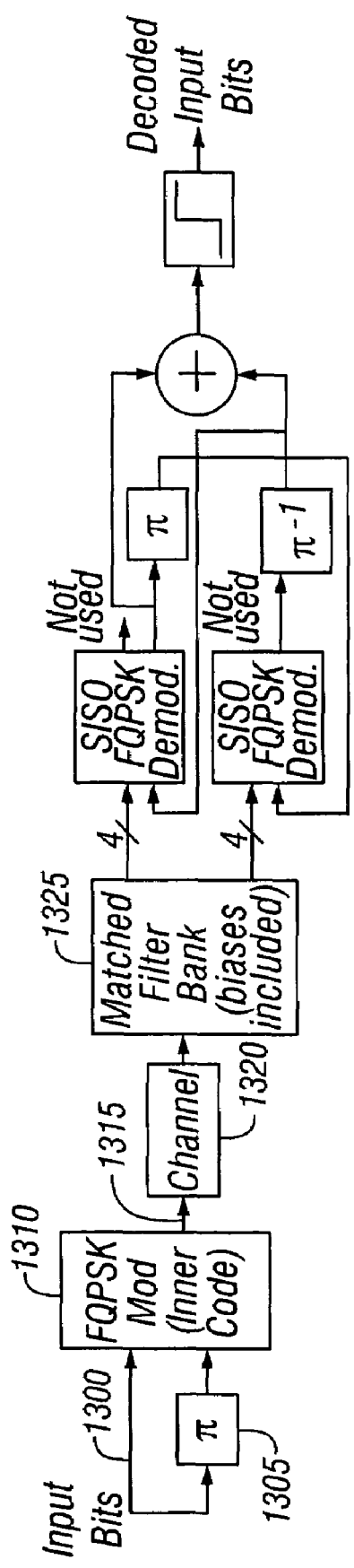

FIGS. 11-13 shows three different embodiments of applying an outer code to the FQPSK modulator/demodulator using a concatenated system with iterative decoding. A number N of input bits 1100 are applied to a demultiplexer 1105 that divides the bits between a pair of outer encoders 1110, 1115 of rate R. These effectively form the I and Q channel bit streams. Each of the outer-encoded bits are applied to interleavers 1120, 1121. The I and Q channels are then applied to an FQPSK inner code modulator 1125 which forms the inner code of such a system. The thus coded stream 1130 is transmitted over the channel 1135. The receiver includes a matched filter bank 1140 with biases, that produces I and Q output channels. Each of the channels goes through a soft input-soft output FQPSK demodulator 1145, 1146 whose output is coupled to a deinterleaver 1150,1151. The resulting I and Q baseband signals are multiplexed in 1165 to provide the decoded output bits 1170.

In this and the other similar embodiments, the energy biased matched filter bank 1140 provides for branch metrics per I and Q channel for the simplified, two state soft in soft out FQPSK coders. The decoders 1145,1146 provide extrinsics associated with the FQPSK encoder input bits to the outer coder via the deinterleavers 1150, 1151. These are applied to the outer decoders 1155,1156 to provide new versions of the received extrinsics by using the code constraint as an output extrinsic through the interleavers. The other outputs are fed back to the inputs of the demodulators 1145,1146.

In operation, the process may repeat/iterate several times. At the end of the final iteration, the output of the outer decoders 1155, 1156 are hard limited in order to produce decisions on the bits.

An alternative system shown in FIG. 12 receives the input bits 1100 directly to an outer encoder 1205, and interleaver 1210 whose output is demultiplexed by 1215 and applied to the FQPSK inner code modulator 1220. This system may use an analogous receiver with the matched filter bank 1140, applied to similar demodulators 1145, 1146. The demodulated outputs are multiplexed by 1250, and deinterleaved 1255, and then outer decoded 1260. The feedback loop in this system uses an interleaver 1265 and demultiplexer 1270 to provide the I and Q channels.

FIG. 13 shows a parallel concatenated coding system, in which a rate 1 outer encoder is formed from the input bitstream and the interleaved input bitstream as in a turbo code. The input bits 1300 are split with one set of bits being interleaved by 1305. The input bits and interleaved input bits are applied in parallel to the inner coder/FQPSK module which outputs a coded bitstream 1315 that is applied to the channel 1320. Data from the channel is received into a matched filter bank type receiver 135 that iteratively calculates the output.

The outer coder may simply be a rate ½ repetition outer coder, with a block interleaver of size n. The outer decoder 1155 may be significantly simplified for the repetition code. For this code, the outer decoder may simply swap the order of successive pairs of bits as shown in FIG. 14.

Computer simulations of this system show an improvement of 3.75 dB at up bit error rate of $10^{-5}$.

Although only a few embodiments have been disclosed in detail above, other modifications are possible.

What is claimed is:

1. An apparatus, comprising:
   at least one soft input-soft output (SISO) demodulator configured to receive input information and feedback information and to produce inner decoded information, wherein said at least one SISO demodulator is configured to perform decoding operations based on a two-state trellis corresponding to a recursive encoder and a signal mapping with four output waveforms in order to produce said inner decoded information, wherein each of the four output waveforms is an average of a corresponding group of full-symbol Feher-Patented Quadrature Phase Shift Keying (FQPSK) waveforms;
   at least one SISO outer decoder configured to receive a deinterleaved version of said inner decoded information and generate outer decoded information;
   wherein said feedback information is obtained from the outer decoded information;
   wherein said apparatus is configured to use the feedback information to iteratively demodulate and decode said input information.

2. The apparatus as in claim 1, further comprising at least one deinterleaver configured to generate said deinterleaved version from the inner decoded information.

3. The apparatus as in claim 1, further comprising a matched filter bank configured to receive an input signal from a channel and generate said input information from said input signal.

4. The apparatus as in claim 1, further comprising at least one hard-limiter configured to generate output bits from the outer decoded information.

5. The apparatus as in claim 1, further comprising at least one interleaver configured to generate said feedback information by interleaving the outer decoded information.

6. An apparatus, comprising:
   a first soft-input soft-output (SISO) demodulator configured to operate on a first stream of input information and on first feedback information to produce first inner decoded information;
   a second SISO demodulator configured to operate on a second stream of input information and on second feedback information to produce second inner decoded information;

a first SISO outer decoder configured to operate on a deinterleaved version of the first inner decoded information to produce first outer decoded information;

a second SISO outer decoder configured to operate on a deinterleaved version of the second inner decoded information to produce second outer decoded information;

wherein the first feedback information is an interleaved version of the first outer decoded information, wherein the second feedback information is an interleaved version of the second outer decoded information;

wherein the first and second SISO demodulators are each configured to perform decoding operations based on a two-state trellis corresponding to a recursive encoder and a signal mapping with four output waveforms, wherein each of the four output waveforms is an average of a corresponding group of full-symbol Feher-Patented Quadrature Phase Shift Keying (FQPSK) waveforms.

7. The apparatus of claim 6, further comprising a matched filter bank configured to receive an input signal from a channel and generate said first and second streams of input information from said input signal.

8. The apparatus of claim 6 further comprising first and second hard limiters, wherein the first hard limiter is configured to generate first bits from the first outer decoded information, wherein the second hard limiter is configured to generate second bits from the second outer decoded information.

9. The apparatus of claim 6, wherein the first and second SISO demodulators and the first and second SISO outer decoders are configured to operate iteratively.

10. An apparatus, comprising:
a first soft-input soft-output (SISO) demodulator configured to operate on a first stream of input information and on first feedback information to produce first inner decoded information;
a second SISO demodulator configured to operate on a second stream of input information and on second feedback information to produce second inner decoded information;
a multiplexer configured to combine the first and second inner decoded information in order to produce intermediate information;
a SISO outer decoder configured to operate on a deinterleaved version of the intermediate information to produce outer decoded information;
wherein the first feedback information is a first portion of an interleaved version of the outer decoded information, wherein the second feedback information is a second portion of the interleaved version of the outer decoded information;
wherein the first and second SISO demodulators are each configured to perform decoding operations based on a two-state trellis corresponding to a recursive encoder and a signal mapping with four output waveforms, wherein each of the four output waveforms is an average of a corresponding group of full-symbol Feher-Patented Quadrature Phase Shift Keying (FQPSK) waveforms.

11. The apparatus of claim 10, further comprising a matched filter bank configured to receive an input signal from a channel and generate said first and second streams of input information.

12. The apparatus of claim 10 further comprising a hard limiter configured to produce bit estimates from the outer decoded information.

13. The apparatus of claim 10, wherein the first and second SISO demodulators and the SISO outer decoder are configured to operate iteratively.

14. An apparatus, comprising:
a first soft-input soft-output (SISO) demodulator configured to operate on a first stream of input information and on first feedback information to produce first decoded information;
a second SISO demodulator configured to operate on a second stream of input information and on second feedback information to produce second decoded information;
wherein the first feedback information is a deinterleaved version of the second decoded information, wherein the second feedback information is an interleaved version of the first decoded information;
wherein the first and second SISO demodulators are each configured to perform decoding operations based on a two-state trellis corresponding to a recursive encoder and a signal mapping with four output waveforms, wherein each of the four output waveforms is an average of a corresponding group of full-symbol Feher-Patented Quadrature Phase Shift Keying (FQPSK) waveforms.

15. The apparatus of claim 14, further comprising a matched filter bank configured to receive an input signal from a channel and generate said first and second streams of input information from the input signal.

16. The apparatus of claim 14 further comprising an adder configured to add the first decoded information and the deinterleaved version of the second decoded information in order to produce resultant information.

17. The apparatus of claim 16 further comprising a hard limiter configured to produce bit estimates based on the resultant information.

18. A method, comprising:
(a) performing soft-input soft-output (SISO) decoding on received input information and feedback information in order to produce inner decoded information, wherein said performing SISO decoding is based on a two-state trellis corresponding to a recursive encoder and a signal mapping with four output waveforms, wherein each of the four output waveforms is an average of a corresponding group of full-symbol Feher-Patented Quadrature Phase Shift Keying (FQPSK) waveforms;
(b) performing SISO outer decoding on a deinterleaved version of said inner decoded information in order to generate outer decoded information;
repeating (a) and (b) at least once;
wherein the feedback information is obtained from the outer decoded information.

19. The method of claim 18, further comprising deinterleaving the inner decoded information in order to obtain said deinterleaved version.

20. The method of claim 18, further comprising performing matched filtering on an input signal in order to generate said input information, wherein said matched filtering includes performing correlations with respect to the four output waveforms.

21. The method claim 18, further comprising hard limiting the outer decoded information in order to obtain output bits.

22. The method claim 18, further comprising performing interleaving on the outer decoded information in order to obtain the feedback information.

* * * * *